United States Patent Office 2,762,977
Patented Sept. 11, 1956

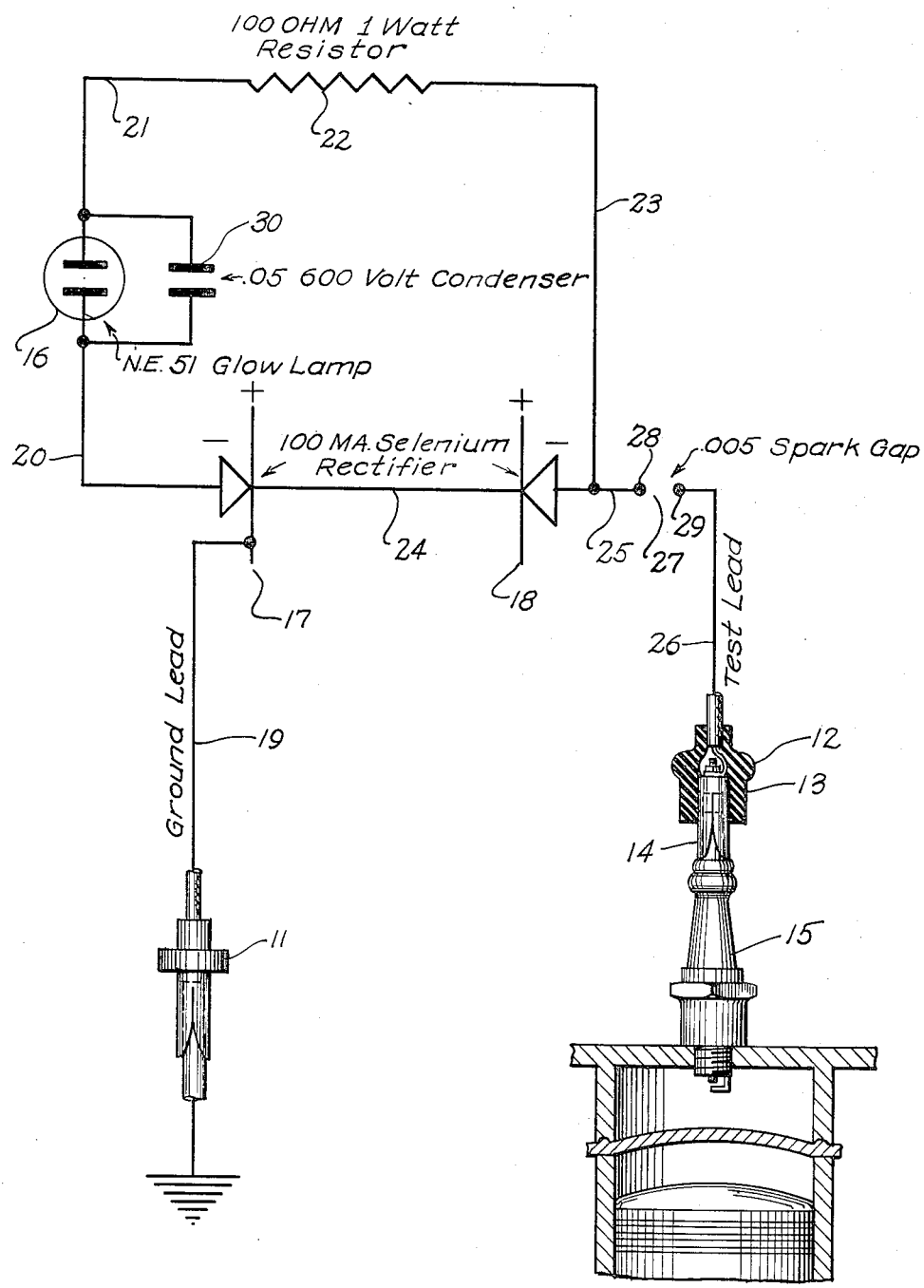

2,762,977

SPARK PLUG POLARITY TESTER

Harold H. Krueger, Sr., Gurnee, Ill.

Application June 26, 1953, Serial No. 364,365

4 Claims. (Cl. 324—133)

This invention relates to electrical testing devices, and more particularly to a polarity tester for determining the polarity of the potential appearing at the center electrodes of the spark plugs of an internal combustion engine.

It is a proven fact that many cases of ignition misfiring, uneven idling, and hard starting of internal combustion engines have been traced to wrong polarity of the potential appearing at the center electrodes of the spark plugs of the engine, inasmuch as the center electrodes of the spark plugs operate at elevated temperatures and will emit more electrons and hence, develop more current, if the center electrodes are negative rather than positive. Therefore, a hotter spark can be developed if the center electrodes of the spark plugs are negative in polarity rather than positive.

A main object of the present invention is to provide a polarity testing device which will show by the glow of a gaseous discharge lamp that the center electrode of a spark plug under test is of negative polarity, whereas failure of the apparatus to obtain a lamp discharge will indicate that the center electrode of the spark plug under test is positive.

A further object of the invention is to provide an improved polarity tester for determining the polarity of the potential appearing at the center electrode of a spark plug of an internal combustion engine, said tester being simple in construction, involving only a few parts, and being easy to use.

A still further object of the invention is to provide an improved polarity tester for determining the polarity of the potential appearing at the center electrodes of the spark plugs of an internal combustion engine, the tester being inexpensive to construct, involving commercially available components, and operating in a smooth and reliable manner to indicate whether the center electrode of a spark plug under test is negative or positive.

Further objects and advantages of the invention will become apparent from the following description and claims, and from the accompanying drawings, wherein the single figure comprises a schematic diagram of a polarity tester constructed in accordance with the present invention.

Referring to the drawing, 11 designates a first contact member of conventional construction which is adapted to be connected in any suitable manner to the engine block or to any other grounded portion of an internal combustion engine to establish an electrical connection therewith. Designated at 12 is a second contact member comprising an insulating outer cap 13 and an inner metal sleeve 14 adapted to be engaged on the center terminal of a spark plug 15, as shown in the drawing. Mounted on a suitable insulating support, not shown, is a neon lamp 16, a first disc-type rectifier 17 and a second disc-type rectifier 18, the rectifiers 17 and 18 being for example of the conventional selenium type. The rectifier 17 has its positive terminal connected to the first contact member 11, as by an insulated wire 19 and has its negative terminal connected by a wire 20 to one terminal of the neon discharge lamp 16. Connected to the other terminal of the neon lamp 16, by a wire 21 is one terminal of a resistor 22, said resistor being of a relatively low value, for example, 100 ohms, as illustrated. The other terminal of the resistor is connected by a wire 23 to the negative terminal of the second rectifier 18. The positive terminal of the second rectifier 18 is connected by a wire 24 to the positive terminal of the first rectifier 17, and thus to the ground wire 19.

Connected between the negative terminal of the second rectifier 18 and the second contact member 12, as by respective wires 25 and 26 is a spark gap 27 comprising the gap electrodes 28 and 29 which are separated by a small air gap of the order of .005.

It will be understood that the elements 17, 18, 16, 22 and the gap electrodes 28 and 29 of the spark gap 27 are mounted on a suitable insulating support and that the insulated wires 19 and 26 are of substantial length, allowing the contact members 11 and 12 to be respectively connected to the engine block or other grounded portion of the internal combustion engine and the center terminal of the spark plug under test.

Connected across the terminals of the neon lamp 16 is a condenser 30 which may have a value of the order of .05 microfarad at a working voltage of 600 volts, as illustrated in the drawing.

The apparatus is employed in the following manner:

The engine is run at a fast idle or medium throttle condition. The first contact member 11 is connected in any suitable manner to the grounded portion of the engine, such as to the engine block. The contact member 12 is then momentarily engaged with the center terminal of the spark plug to be tested. If the center terminal of the spark plug is negative, the lamp 16 will glow, thereby indicating the correct polarity of the center electrode of the spark plug. Failure of the lamp to glow when momentary contact of the metal sleeve 14 of contact member 12 is made with the center terminal of the spark plug indicates the wrong polarity, or positive polarity of the center contact of the electrode.

It will be noted that when the terminals 11 and 12 are connected to the ignition circuit in the manner shown in the drawings, a first circuit is established from the high tension spark plug center electrode to ground comprising the wire 26, the spark gap 27, the second rectifier, the wire 24, the wire 19, and the contact member 11 which is grounded. The spark occurring between the gap electrodes 28 and 29 produces oscillations in this circuit which are, of course, rectified, and which are also substantially damped by passage of the oscillatory current through the second rectifier 18. The second rectifier 18, being of the disc type, exhibits considerable capacitance, and therefore acts somewhat in the manner of a condenser, namely as a capacitive reactance. Thus, the rectifier 18 serves as a load reactance across which a pulsating voltage appears when the high tension electrode of the spark plug 15 is negative. Due to the relatively high resistance of the rectifier 18 for current in the opposite direction, practically no current flows through the rectifier when the high tension electrode of the spark plug is positive.

Connected across the aforesaid load impedance, comprising the rectifier 18 is the indicator circuit consisting of the rectifier 17, the neon lamp 16, and the resistor 22, connected in series. When current is flowing through the rectifier 18, as when the center terminal of the spark plug 15 is negative in polarity, as above explained, a substantial pulsating potential exists across the rectifier 18 due to its impedance and therefore a pulsating current flows through the indicator circuit, namely, through the wire 23, the resistor 22, the wire 21, the neon discharge lamp 16, the wire 20, and the rectifier 17, the rectifier 17 being of the correct polarity to pass current under conditions where the center terminal of spark plug 15 is negative. Therefore, the glowing of the discharge lamp 16 indicates the proper polarity of the spark plug center terminal.

The condenser 30 connected across the neon lamp 16 serves to smooth the pulsating potential applied across said lamp to a substantial degree, whereby a steady glow is obtained from the lamp rather than an intermittent discharge, and also serves to smooth out the peaks in the current flowing through the indicator circuit, whereby the magnitude of the potentials developed across the rectifier 17 are somewhat reduced, thereby extending the life of said rectifier. The resistor 22 also serves as a current limiting device to prevent excessive potentials from being applied across the rectifier 17.

While a specific embodiment of an improved polarity tester for determining the polarity of the potential appearing at the center electrodes of the spark plug of an internal combustion engine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A polarity tester for determining the polarity of the potentials appearing at the center electrodes of the spark plugs of an internal combustion engine comprising first and second contact members adapted to be connected respectively with the grounded side and center contact of a spark plug, a gaseous discharge lamp, a first rectifier having its positive terminal connected to said first contact member and its negative terminal connected to one terminal of the discharge lamp, a spark gap connected in series between the other terminal of the discharge lamp and the second contact member, and a second rectifier having substantial reactance and having its positive terminal connected to said first contact member and its negative terminal connected to said other terminal of the discharge lamp, whereby a substantial reactance voltage will appear across the terminals of the second rectifier when the center electrode of the spark plug is of negative polarity, but no reactance voltage will appear across the terminals of the second rectifier when said center electrode is of positive polarity.

2. A polarity tester for determining the polarity of the potentials appearing at the center electrodes of the spark plugs of an internal combustion engine comprising first and second contact members adapted to be connected respectively with the grounded side and center contact of a spark plug, a gaseous discharge lamp, a first rectifier having its positive terminal connected to said first contact member and its negative terminal connected to one terminal of the discharge lamp, a resistor connected to the other terminal of said lamp, a spark gap connected in series between the resistor and the second contact member, and a second rectifier having substantial reactance and having its positive terminal connected to said first contact member and its negative terminal connected to the connection between the resistor and the spark gap, whereby a substantial reactance voltage will appear across the terminals of the second rectifier when the center electrode of the spark plug is of negative polarity, but no reactance voltage will appear across the terminals of the second rectifier when said center electrode is of positive polarity.

3. A polarity tester for determining the polarity of the potentials appearing at the center electrodes of the spark plugs of an internal combustion engine comprising first and second contact members adapted to be connected respectively with the grounded side and center contact of a spark plug, a gaseous discharge lamp, a first rectifier having its positive terminal connected to said first contact member and its negative terminal connected to one terminal of the discharge lamp, a resistor connected to the other terminal of said lamp, a spark gap connected in series between the resistor and the second contact member, a second rectifier having substantial reactance and having its positive terminal connected to said first contact member and its negative terminal connected to the connection between the resistor and the spark gap, and a condenser connected across said discharge lamp, whereby a substantial reactance voltage will appear across the terminals of the second rectifier when the center electrode of the spark plug is of negative polarity, but no reactance voltage will appear across the terminals of the second rectifier when said center electrode is of positive polarity.

4. A polarity tester for determining the polarity of the potential appearing at the center electrodes of the spark plugs of an internal combustion engine comprising a rectifier, a spark gap having one terminal connected to the negative pole of said rectifier, contact means engageable with the center electrode of a spark plug connected to the other spark gap terminal, a ground conductor connected to the positive pole of the rectifier, said rectifier having substantial reactance, whereby a substantial reactance voltage will appear thereacross when the spark plug electrode is negative in polarity, and an indicating circuit connected across the terminals of said rectifier, said indicating circuit comprising a glow lamp and a rectifier connected in series, said last named rectifier having its positive pole connected to said ground conductor and its negative pole connected to one terminal of said glow lamp.

References Cited in the file of this patent

UNITED STATES PATENTS

| 1,971,899 | Buttolph | Aug. 28, 1934 |
| 2,244,717 | Lansdale | June 10, 1941 |
| 2,254,175 | Eltgroth | Aug. 26, 1941 |
| 2,482,016 | McCoy | Sept. 13, 1949 |

FOREIGN PATENTS

| 190,214 | Great Britain | Dec. 11, 1922 |
| 967,786 | France | Nov. 10, 1950 |